(12) United States Patent
Yamaji et al.

(10) Patent No.: US 8,448,982 B2
(45) Date of Patent: May 28, 2013

(54) AIR BAG DEVICE

(75) Inventors: Naoki Yamaji, Settsu (JP); Nobuhiko Yoshii, Settsu (JP); Keita Yamauchi, Settsu (JP)

(73) Assignee: Ashimori Industry Co., Ltd., Osaka-shi (JP)

( * ) Notice: Subject to any disclaimer, the term of this patent is extended or adjusted under 35 U.S.C. 154(b) by 0 days.

(21) Appl. No.: 13/577,802

(22) PCT Filed: Feb. 17, 2011

(86) PCT No.: PCT/JP2011/053326
§ 371 (c)(1),
(2), (4) Date: Aug. 8, 2012

(87) PCT Pub. No.: WO2011/108360
PCT Pub. Date: Sep. 9, 2011

(65) Prior Publication Data
US 2012/0306183 A1    Dec. 6, 2012

(30) Foreign Application Priority Data
Mar. 4, 2010   (JP) .................... 2010-047366

(51) Int. Cl.
*B60R 21/203*   (2006.01)

(52) U.S. Cl.
USPC ........................................ 280/731; 280/728.2

(58) Field of Classification Search
USPC .................. 280/728.2, 731; 200/61.54, 61.55
See application file for complete search history.

(56) References Cited

U.S. PATENT DOCUMENTS

| | | | | |
|---|---|---|---|---|
| 7,533,897 B1 * | 5/2009 | Xu et al. | ..................... | 280/728.2 |
| 7,694,997 B2 * | 4/2010 | Burghardt et al. | .......... | 280/728.2 |
| 2001/0054810 A1 | 12/2001 | Sakane et al. | | |
| 2004/0017068 A1 | 1/2004 | Weis et al. | | |
| 2006/0175816 A1 * | 8/2006 | Spencer et al. | ............... | 280/731 |
| 2007/0132218 A1 * | 6/2007 | Kim et al. | ..................... | 280/731 |
| 2008/0012270 A1 * | 1/2008 | Weigand et al. | ........... | 280/728.2 |
| 2011/0204602 A1 * | 8/2011 | James et al. | ............... | 280/728.2 |
| 2012/0279835 A1 * | 11/2012 | Shellabarger et al. | ..... | 200/61.55 |
| 2012/0306183 A1 * | 12/2012 | Yamaji et al. | ................. | 280/731 |
| 2012/0306184 A1 * | 12/2012 | Yamaji et al. | ................. | 280/731 |
| 2012/0313357 A1 * | 12/2012 | Yamaji et al. | ................. | 280/731 |

FOREIGN PATENT DOCUMENTS

| | | |
|---|---|---|
| FR | 2 790 044 | 8/2000 |
| JP | 2001 233159 | 8/2001 |
| JP | 2002 12112 | 1/2002 |
| JP | 2003 312426 | 11/2003 |
| KR | 10 2005 0021182 | 3/2005 |

OTHER PUBLICATIONS

International Search Report Issued Mar. 22, 2011 in PCT/JP11/053326 Filed Feb. 17, 2011.
International Preliminary Report on Patentability issued Oct. 11, 2012 in PCT/JP2011/053326 filed Feb. 17, 2011.
Written Opinion issued Mar. 22, 2011 in PCT/JP2011/053326 filed Feb. 17, 2011 with English language translation.

* cited by examiner

*Primary Examiner* — Drew Brown
(74) *Attorney, Agent, or Firm* — Oblon, Spivak, McClelland, Maier & Neustadt, L.L.P.

(57) ABSTRACT

Provided is an airbag device mounted to a steering wheel in which a mounting member is provided in a protruding manner. The airbag device includes an airbag, an inflator configured to inflate and deploy the airbag, a cover that covers the airbag, and a mounting plate. A locking body configured to be locked with the mounting member is held on the mounting plate via the holding member. The mounting plate includes a recess that is recessed from a portion for mounting the inflator. The locking body is provided in the recess of the mounting plate.

6 Claims, 11 Drawing Sheets

F I G . 1 2
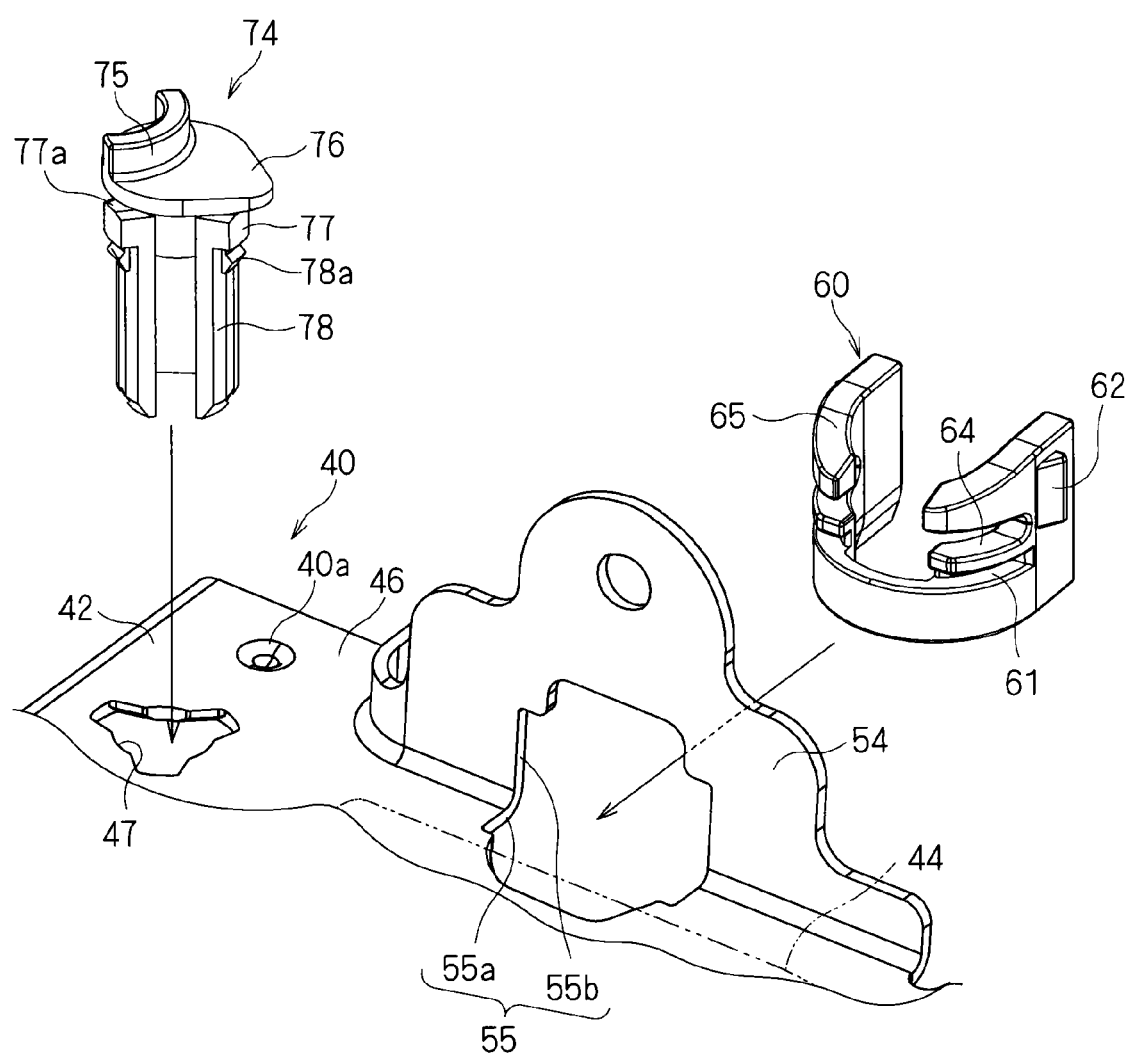

AIR BAG DEVICE

TECHNICAL FIELD

The present invention relates to the technology of mounting an airbag device to a steering wheel.

BACKGROUND ART

Conventionally, Patent Document 1 discloses the technology of mounting an airbag device to a steering wheel.

According to Patent Document 1, pins are provided to any one of a base plate supporting a back body that is inflated and deployed and a steering wheel, and mounting parts into which the pins are inserted are provided to the other of the base plate and the steering wheel. In addition, a switch wire as a lock member is mounted to the mounting parts. Then, the pins are inserted into the mounting parts, whereby the switch wire is engaged with the pins, which keeps the state in which the base plate and the steering wheel are installed, that is, the state in which the airbag device is mounted.

PRIOR ART DOCUMENT

Patent Document

Patent Document 1: Japanese Patent Application Laid-Open No. 2001-233159

SUMMARY OF THE INVENTION

Problem to be Solved by the Invention

In the technology disclosed in Patent Document 1, however, the switch wire protrudes considerably from the surface of the base plate or steering wheel in the state before installing. Therefore, it is feared that a hand of an operator may come into contact with the switch wire during an assembly operation, and accordingly, the switch wire may become detached from the mounting parts.

Therefore, an object of the present invention is to prevent a locking body from becoming detached during an assembly operation.

Means to Solve the Problem

In order to solve the above-mentioned problem, a first aspect relates to an airbag device that is mounted to a steering wheel in which a mounting member is provided in a protruding manner, including: an airbag; an inflator configured to inflate and deploy the airbag; a cover covering the airbag folded; a mounting plate to which the airbag, the inflator, and the cover are secured; a locking body configured to be locked with the mounting member; and a holding member holding the locking body on the mounting plate, wherein the mounting plate includes a recess recessed from a portion for mounting the inflator, and the locking body is provided in the recess.

According to a second aspect, in the airbag device of the first aspect, the locking body is provided such that more than a half of a cross section thereof does not protrude from a surface of the portion for mounting the inflator.

According to a third aspect, in the airbag device of the first or second aspect, the recess is formed to be recessed from the surface of the portion for mounting the inflator in the mounting plate toward the steering wheel side, and the locking body is provided on the airbag side with respect to the mounting plate.

According to a fourth aspect, in the airbag device of any one of the first to third aspects, the locking body includes a metal wire configured to be elastically deformed and is held on the mounting plate so as to exert a biasing force in a direction to be locked with the mounting member.

According to a fifth aspect, in the airbag device according to any one of the first to fourth aspects, at least one of the mounting member and the holding member protrudes into an airbag housing space between the mounting plate and the cover, and a tip portion of the protruding portion includes an interference suppressing part having a height dimension that gradually becomes smaller toward an inside of the airbag housing space.

According to a sixth aspect, in the airbag device of any one of the first to fifth aspects, an inflator disposing hole for disposing the inflator is formed in the mounting plate, and the recess is provided so as to surround the inflator disposing hole from at least two directions.

Effects of the Invention

According to the first aspect, the mounting plate includes the recess that is recessed from the portion for mounting the inflator, and the locking body is provided in the recess, and thus, a hand or the like of an operator is unlikely to come into contact with the locking body during an assembly operation. This prevents the locking body from becoming detached during the assembly operation.

According to the second aspect, the locking body is provided such that more than a half of the cross section thereof does not protrude from the surface of the portion for mounting the inflator, and thus, a hand or the like of an operator is more unlikely to come into contact with the locking body during the assembly operation. This prevents the locking body from becoming detached during the assembly operation more reliably.

According to the third aspect, the locking body is provided on the airbag side with respect to the mounting plate, and thus, the external force on the locking body is unlikely not to be exerted after the airbag device is assembled. As a result, the locking body is unlikely to become detached. Further, the locking body is disposed in the recess formed so as to be recessed from the surface of the portion for mounting the inflator in the mounting plate toward the steering wheel side, which makes it easy to sufficiently secure the space for housing the airbag between the mounting plate and the cover.

According to the fourth aspect, the locking body is formed of a metal wire that can be elastically deformed, which enables the locking body itself to generate the biasing force on the mounting member. In addition, the biasing force increases the locking force of the mounting member and the locking body.

According to the fifth aspect, the tip portions of the protruding portion of the mounting member and the holding member, which protrude into the airbag housing space, include the interference suppressing part having a height dimension that gradually becomes smaller toward an inside of the airbag housing space. Accordingly, if the airbag that is inflated and deployed and the mounting member or the holding member come into contact with each other, it is possible to prevent the contact from interfering the operation of inflating and deploying the airbag. This stabilizes the operation of deploying the airbag.

According to the sixth aspect, the recess is provided so as to surround the inflator disposing hole from at least two directions, and thus, the locking body can be disposed around the inflator, so that the mounting member can be locked with the locking body at a plurality of positions. This further stabilizes the state in which the airbag device is mounted.

BRIEF DESCRIPTION OF DRAWINGS

FIG. 12 is an exploded perspective view showing the mounting plate, the holding member, and an auxiliary biasing member.

EMBODIMENT FOR CARRYING OUT THE INVENTION

Figure 1:
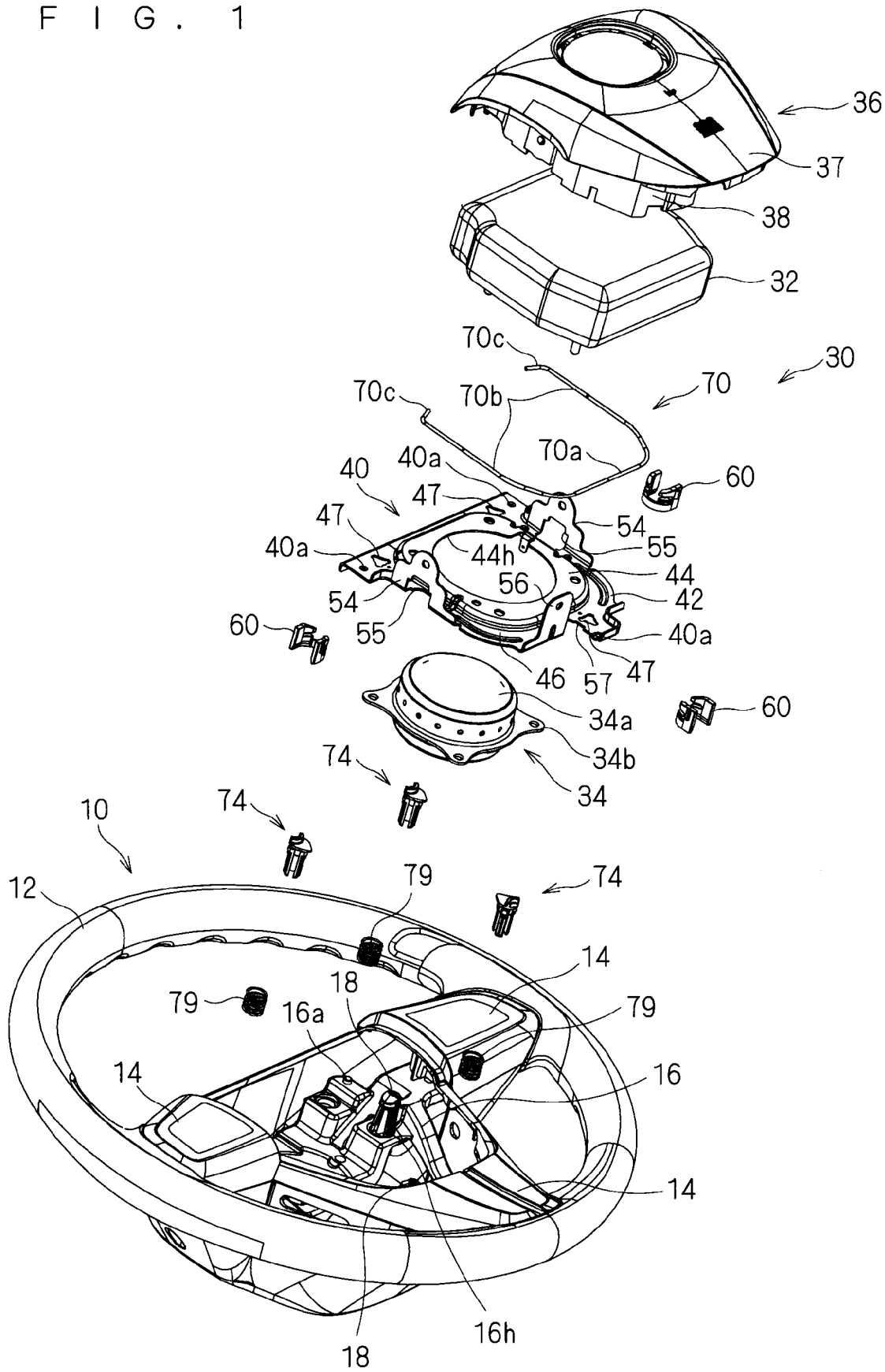
FIG. 1 is an exploded perspective view showing an airbag device according to an embodiment and a steering wheel.

Hereinafter, an airbag device according to an embodiment is described. FIG. 1 is an exploded perspective view showing a steering wheel 10 and an airbag device 30.

The airbag device 30 is mounted to the steering wheel 10 for steering a vehicle.

The steering wheel 10 is now described. The steering wheel 10 includes a wheel main body 12 and spokes 14. The wheel main body 12 is a portion that receives a steering force by a person. The spoke 14 is formed into a rod shape extending from an inner peripheral portion of the wheel main body 12 toward a center thereof, and is connected to a steering shaft at the center of the wheel main body 12. Three spokes 14 are provided in this case, which may be, for example, two.

Exposed approximately at the center portion of the steering wheel 10 is a core member 16. The core member 16 is formed of a conductive member such as metal. Mounting members 18 are provided to the core member 16 in a protruding manner. In this case, three mounting members 18 are provided around the center of the steering wheel 10 (FIG. 1 shows only a part thereof). Needless to say, there may be provided one mounting member 18 to be locked with a locking body 70 described below, which may be two or more.

Figure 2:
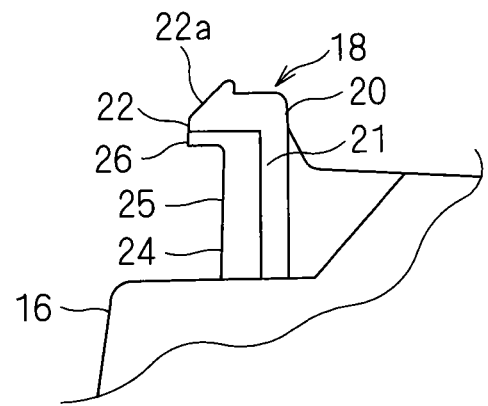
FIG. 2 is a side view showing a mounting member.
Figure 3:
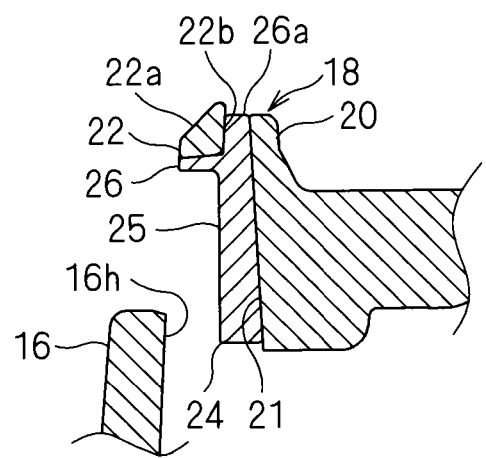
FIG. 3 is a cross-sectional view showing the mounting member.
Figure 4:
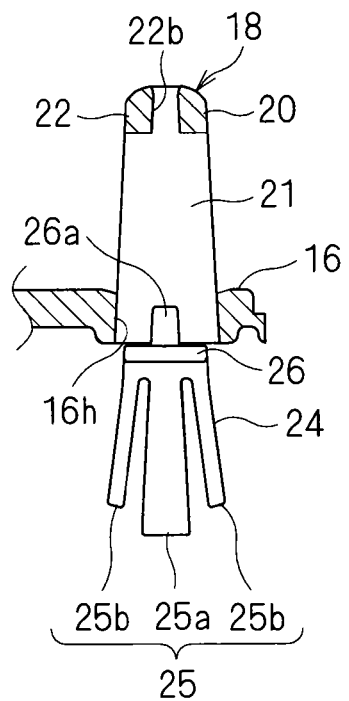
FIG. 4 is an explanatory view showing a procedure of mounting a cap member to a mounting body member.

FIG. 2 is a side view showing the mounting member 18, and FIG. 3 is a cross-sectional view showing the mounting member 18. FIGS. 4 to 7 are explanatory views showing a procedure of mounting a cap member 24 to a mounting body member 20. The cap member 24 may not be provided.

The mounting member 18 is configured so as to be locked with the locking body 70 described below. More specifically, the mounting member 18 includes the mounting body member 20 integrally formed with the core member 16, and the cap member 24 mounted to the mounting body member 20.

The mounting body member 20 includes a column part 21 and a locking protrusion 22. The column part 21 is formed so as to protrude from the core member 16 toward the front side of the steering wheel 10 (airbag device 30 side). The locking protrusion 22 is provided at the tip of the column part 21 in a protruding manner. In this case, the locking protrusion 22 is formed to protrude toward the inner peripheral side of the steering wheel 10. Provided at the tip portion of the locking protrusion 22 on the airbag device 30 side is an inclined surface 22a inclined such that a height dimension thereof becomes gradually smaller toward the center of the steering wheel 10. In the mounting state of the airbag device 30 described below, the tip portion of the mounting member 18 is disposed in an airbag housing space. In this state, the inclined surface 22a functions as an interference suppressing part whose height dimension becomes gradually smaller toward the inside of the airbag housing space. The inclined surface 22a is not necessarily required to be flat but may be curved.

A through hole 16h is formed at the position in the core member 16, which is located in the proximal-end-side portion of the mounting body member 20 and is opposed to the locking protrusion 22, and a recess 22b is formed in an inwardly facing surface of the locking protrusion 22. The cap member 24 is, for example, mounted with the through hole 16h and the recess 22b. Note that the recess 22b passes through the locking protrusion 22 in this case, which is not necessarily required to pass therethrough.

The cap member 24 is formed of a non-conductive member such as a resin, and is mounted to the mounting body member 20 so as to cover the inner corner portion between the column part 21 and the locking protrusion 22 in the mounting body member 20. More specifically, the cap member 24 includes a side plate part 25 covering the surface of the column part 21 on the side on which the locking protrusion 22 protrudes and an end plate part 26 covering the internal surface of the locking protrusion 22. The side plate part 25 includes a center plate part 25a having an elongated plate shape and a pair of slip-off prevention pieces 25b provided at both side portions of the center plate part 25a. The slip-off prevention piece 25b extends while gradually widening from the end portion of the center plate part 25a on the end plate part 26 side toward the end portion thereof on the other end side. The pair of slip-off prevention pieces 25a are elastically deformed to become narrow, to thereby pass through the through hole 16h. Meanwhile, the pair of slip-off prevention pieces 25b become widened by the elastic restoring force thereof, whereby the end portions of the pair of slip-off prevention pieces 25b can be engaged with the peripheral portion of the through hole 16h. In addition, formed at the outer surface of the end plate part 26 is a protrusion 26a that can be fitted into the recess 22b of the locking protrusion 22.

Figure 5:
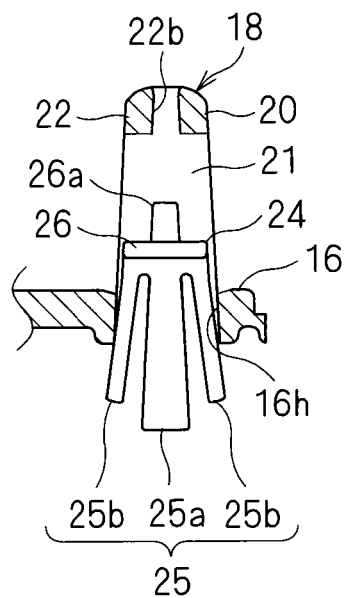
FIG. 5 is another explanatory view showing the procedure of mounting the cap member to the mounting body member.
Figure 6:
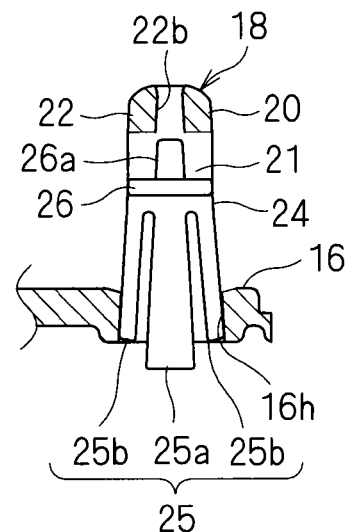
FIG. 6 is still another explanatory view showing the procedure of mounting the cap member to the mounting body member.
Figure 7:
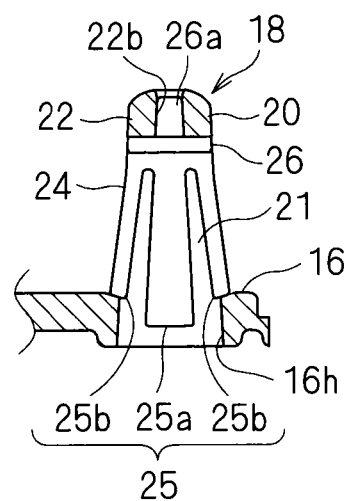
FIG. 7 is yet still another explanatory view showing the procedure of mounting the cap member to the mounting body member.

When the cap member 24 is inserted into the through hole 16h from the proximal-end-side of the mounting body member 20 (see FIG. 4), the outer surfaces of the pair of slip-off prevention pieces 25b come into sliding contact with the periphery of the through hole 16h, so that the pair of slip-off prevention pieces 25b are elastically deformed toward the center plate part 25a side (see FIG. 5). Accordingly, the pair of slip-off prevention pieces 25b become narrow, which enables the cap member 24 to pass through the through hole 16h (see FIG. 6). Then, the cap member 24 passes through the through hole 16h, whereby the respective end portions of the pair of slip-off prevention pieces 25b elastically return to be engaged with the peripheral portion of the through hole 16h, and the protrusion 26a is fitted into the recess 22b (see FIG. 7). As a result, the cap member 24 is mounted and secured to the mounting body member 20 at a fixed position.

The airbag device 30 is described. Description is first given of the overall configuration of the airbag device 30, and then, of the configuration for mounting the airbag device 30 to the steering wheel 10.

Figure 8:
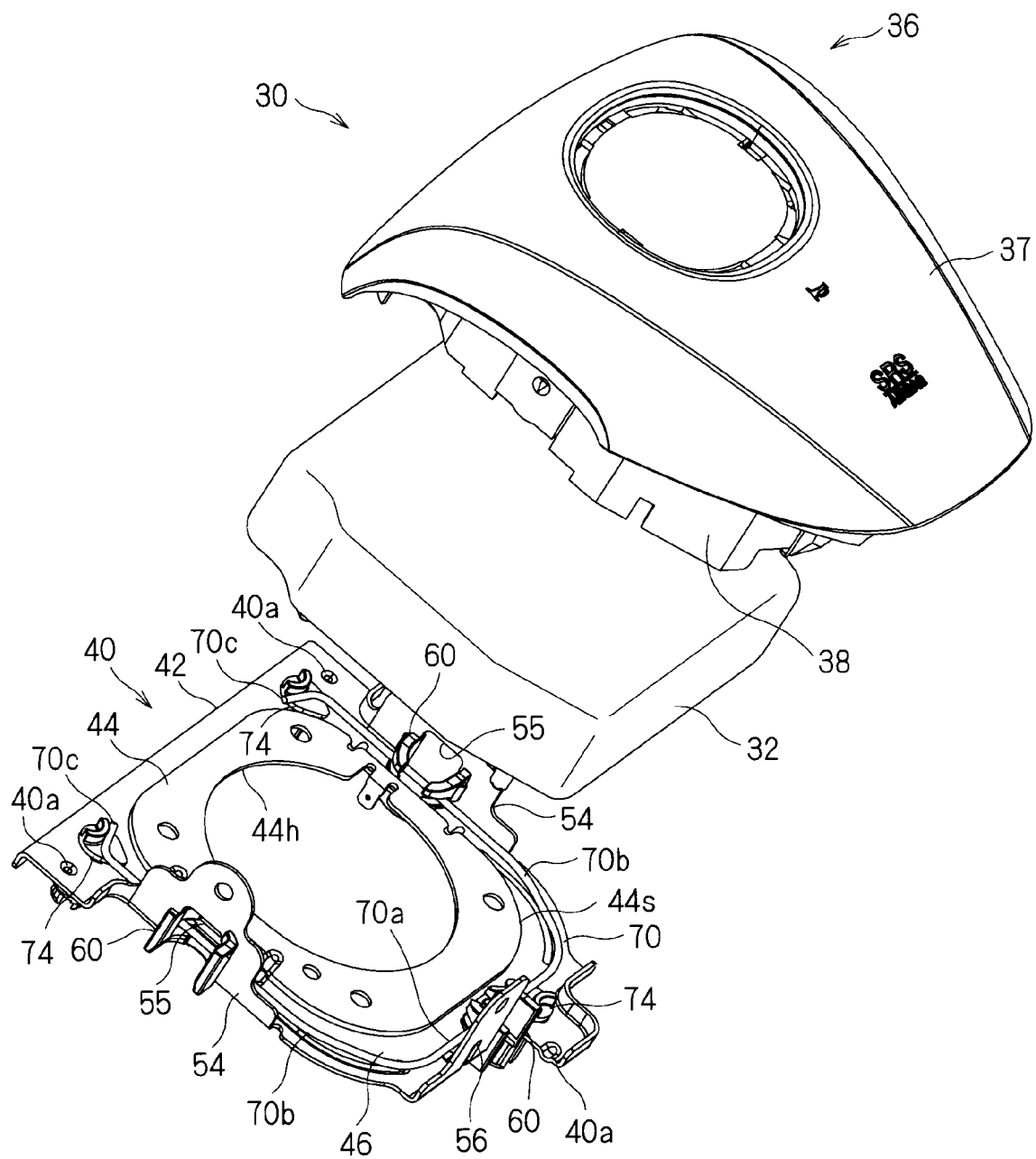
FIG. 8 is an exploded perspective view showing an airbag, a cover, and a mounting plate of the airbag device.

FIG. 8 is an exploded perspective view showing an airbag 32, a cover 36, and a mounting plate 40 of the airbag device 30. As shown in FIGS. 1 and 8, the airbag device 30 includes the airbag 32, the inflator 34, the cover 36, and the mounting plate 40.

The airbag 32 is formed of a fabric or the like into a bag shape, and is mounted to the mounting plate 40 in the folded state together with the inflator 34.

The inflator 34 serves to inflate and deploy the airbag 32. In this case, the inflator 34 includes an inflator body part 34a having a short cylindrical shape and a mounting flange 34b formed on the outer periphery of the inflator body part 34a (see FIG. 1). The mounting flange 34b is formed into a plate shape extending such that the outer perimeter thereof has an approximately square shape, and screw holes are formed at four corner portions thereof. The inflator 34 is mounted and secured to the mounting plate 40 via the mounting flange 34b. An ignition device, a gas generator, and the like are incorporated in the inflator body part 34a. Upon reception of, for example, a detection signal from an impact detection part or the like in a vehicle collision, the ignition device ignites the gas generator. Accordingly, the gas generator burns, and the gas generated as a result of the burning is supplied into the airbag 32.

The cover 36 is a member formed of a resin or the like, which is secured to the mounting plate 40 so as to cover the airbag 32. In this case, the cover 36 includes a cover body part 37 having a gently curved shape and an enclosure part 38 provided on the back surface side of the cover body part 37. The enclosure part 38 and the mounting plate 40 are secured to each other by, for example, riveting. Further, the space for housing the folded airbag 32 is formed in the space surrounded by the cover body part 37 and the enclosure part 38. Tear lines that are easily torn upon reception of the force for inflating and deploying the airbag 32 are formed in the cover body part 37. The cover body part 37 is disposed such that the surface thereof is continuous from the surfaces of the spokes 14 in the state where the airbag device 30 is mounted to the steering wheel 10.

The mounting plate 40 is a member formed of a metal plate or the like, which is a member to which the airbag 32, the inflator 34, and the cover 36 are mounted. The airbag 32, the inflator 34, and the cover 36 are directly mounted to the mounting plate 40 in this case, which may be indirectly secured thereto via, for example, another bracket. The mounting plate 40 is described below in more detail.

When the airbag 32 is inflated by a gas supply from the inflator 34, the cover 36 is torn and opened upon reception of the force for inflating and deploying the airbag 32. As a result, the airbag 32 is inflated and deployed into a bag shape between the steering wheel 10 and a driver.

The configuration for mounting the airbag device 30 to the steering wheel 10 is described.

Figure 9:
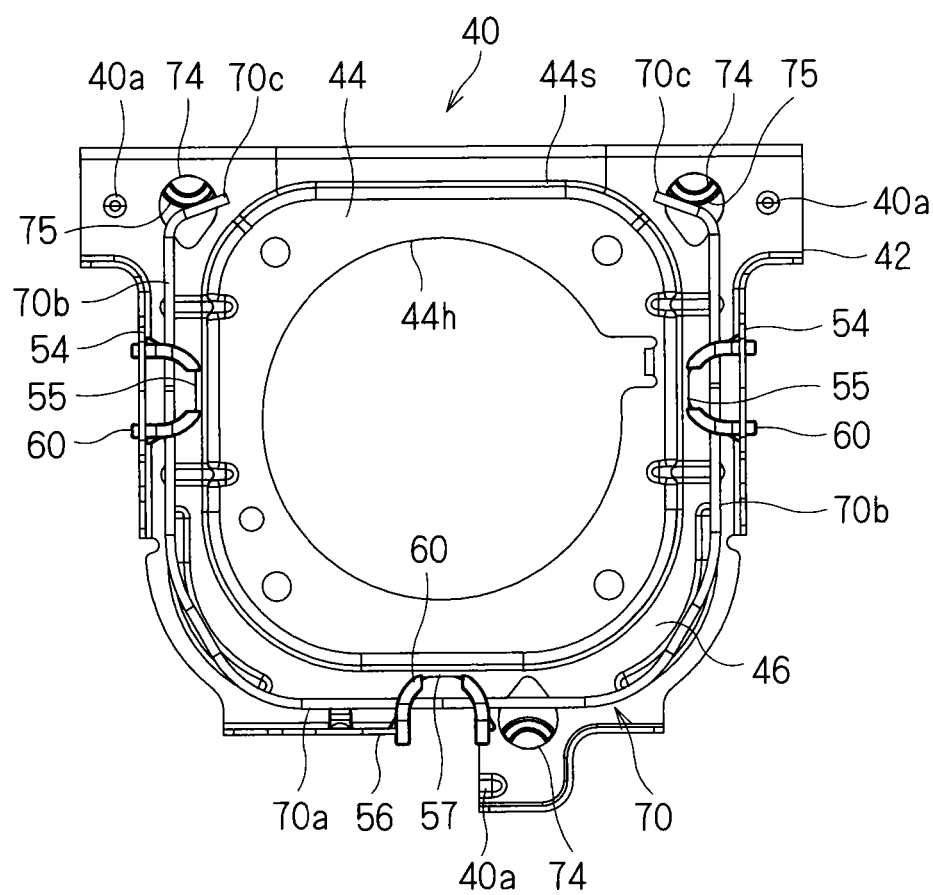
FIG. 9 is a front view showing the mounting plate, a holding member, and a locking body.
Figure 10:
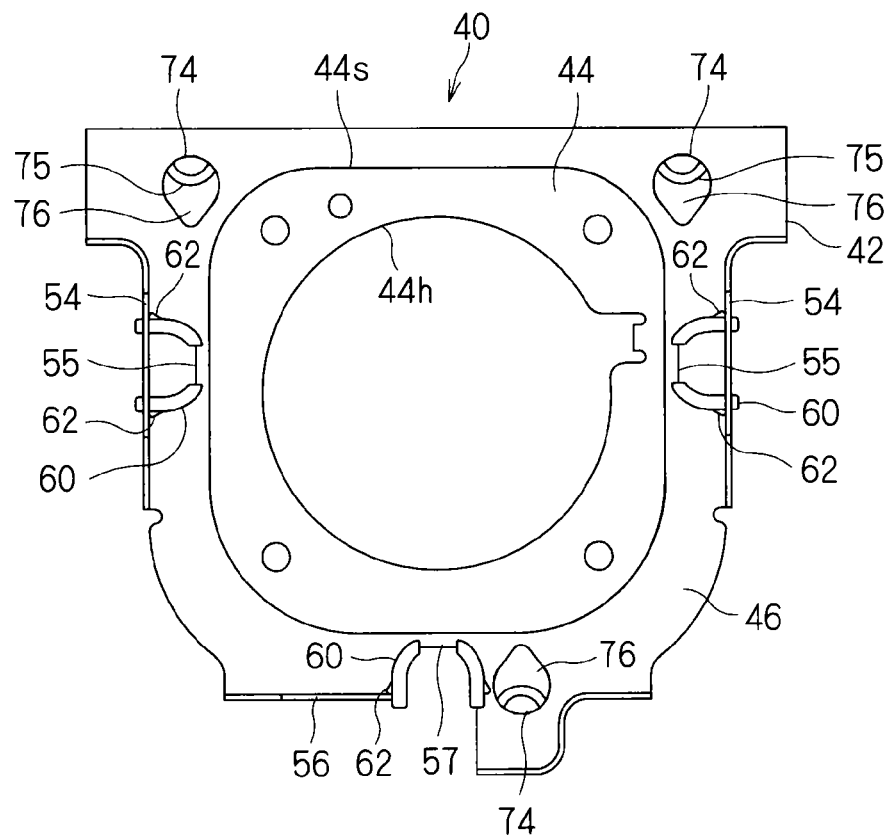
FIG. 10 is a schematic front view showing the mounting plate.
Figure 11:
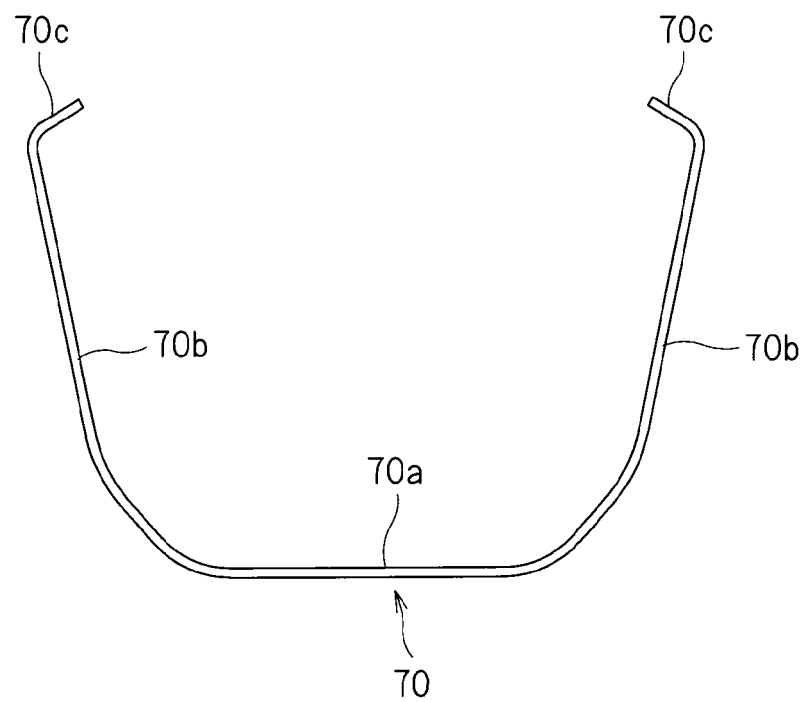
FIG. 11 is a front view showing the locking body.

FIG. 9 is a front view showing the mounting plate 40, the holding members 60, and the locking body 70, FIG. 10 is a schematic front view showing the mounting plate 40, FIG. 11 is a front view showing the locking body 70, and FIG. 12 is an exploded perspective view showing the mounting plate 40, the holding member 60, and an auxiliary biasing member 74.

That is, the locking body 70 is held on the mounting plate 40 of the airbag device 30 via the holding members 60. Then, the mounting members 18 are locked with the locking body 70 in a detachable manner, whereby the airbag device 30 is mounted to the steering wheel 10.

More specifically, the mounting plate 40 is a member formed by, for example, pressing a metal plate, and includes a main mounting plate part 42, side securing plate parts 54, and a bottom securing plate part 56.

The main mounting plate part 42 is formed into a plate shape large enough to block the opening of the enclosure part 38 of the cover 36. Formed at the center portion of the main mounting plate part 42 is an inflator disposing hole 44h in which the inflator body part 34a can be disposed. An approximately square-shaped area on the outer periphery of the inflator disposing hole 44h is formed as an inflator mounting plate part 44 protruding toward the airbag 32 side via a step 44s, beyond the outer periphery of the approximately square-shaped area. In the state in which the inflator body part 34a is disposed in the inflator disposing hole 44h, the mounting flange 34b is overlaid on the inflator mounting plate part 44 and is secured thereto by, for example, screwing, so that the inflator 34 is mounted and secured to the mounting plate 40.

The outer-perimeter-side portion of the inflator mounting plate part 44 is formed as a recess 46 that is recessed toward the steering wheel 10 side from the surface of the inflator mounting plate part 44 on the airbag 32 side via the step 44s. In this case, the recess 46 is formed so as to surround the inflator disposing hole 44h from four sides. Needless to say, it suffices that the recess is formed in the area that surrounds the inflator disposing hole from at least two directions. It is preferable that the depth dimension of the recess 46 be set to be larger (in this case, much larger) than the radius of the locking body 70, and that the locking body 70 be provided such that more than a half of a cross section thereof should not protrude from the surface of the inflator mounting plate part 44. More preferably, the depth dimension of the recess 46 is set to be larger (in this case, much larger) than the diameter of the locking body 70, and the entire locking body 70 does not protrude from the surface of the inflator mounting plate part 44 but is located at a position below the front surface of the inflator mounting plate part 44 on the recess 46 side.

Here, the locking body 70 is disposed in the recess 46 and is configured to be detachably locked with the mounting member 18. More specifically, the locking body 70 is formed by bending and deforming a metal wire that can be elastically deformed, and has a shape in which an intermediate wire portion 70a and a pair of side wire portions 70b are continuous so as to form a U-shape. In the initial state before the locking body 70 is mounted to the recess 46 of the mounting plate 40, the pair of side wire portions 70b extend beyond the width dimension of the mounting plate 40. In addition, the locking body 70 is mounted in the recess 46 of the mounting plate 40 in the state in which the pair of side wire portions 70b are pushed to become narrow. Provided at the tip portions of the pair of side wire portions 70b are inclined wire portions 70c that are inclined in a direction in which the pair of wire portions 70b become close to each other toward the tip side thereof. When the inclined wire portions 70c come into sliding contact with the auxiliary biasing members 74 in the state in which the locking body 70 is mounted to the mounting plate 40, the force for outwardly biasing the intermediate wire portion 70a is exerted. The configuration for holding the locking body 70 on the mounting plate 40 is further described below.

The pair of side securing plate parts 54 are provided in both side portions of the main mounting plate part 42, and the bottom securing plate part 56 is provided to the bottom of the main mounting plate part 42. The pair of side securing plate parts 54 and the bottom securing plate part 56 are provided so as to extend along the enclosure part 38 toward the cover 36 side. The pair of side securing plate parts 54 and the bottom securing plate part 56 are secured to the enclosure part 38 by, for example, riveting, so that the mounting plate 40 and the cover 36 are secured to each other. Note that a top securing plate part that extends toward the side opposite to the cover 36 is also provided to the top of the main mounting plate part 42, and the top securing part is also secured to the cover 36 by riveting, screwing or the like.

A side holding member mounting recess 55 is formed in each portion ranging from the side portion of the main mounting plate part 42 to the side securing plate part 54 (see FIG. 12). A portion 55a of the side holding member mounting recess 55 on the main mounting plate part 42 side is formed into a cut-out hole shape into which the mounting member 18 can be inserted, and a portion 55b of the side holding member mounting recess 55 on the side securing plate part 54 side is formed into a cut-out hole shape into which the holding member 60 can be inserted. Further, a bottom holding member mounting recess 57 is formed in a lower portion of the main mounting plate part 42. The bottom holding member mounting recess 57 is formed into a cut-out shape into which the mounting member 18 can be inserted. The side edge on one side of the bottom securing plate part 56 extends toward the cover 36 side so as to be continuous from the side portion on one side of the bottom holding member mounting recess 57. The pair of side holding member mounting recesses 55 and the bottom holding member mounting recess 57 are formed at the positions corresponding to the three mounting members 18.

The holding member 60 is a member formed of an insulating member such as a resin, and is configured to hold the locking body 70 on the mounting plate 40. More specifically, the holding member 60 is formed into a semi cylindrical shape into which the mounting member 18 can be inserted along an axis direction. A securing groove 61 corresponding to the thickness of the main mounting plate part 42 is formed in the outer peripheral portion of the holding member 60, and locking protrusions 62 are formed on both outer peripheral side portions of the holding member 60. The locking protrusion 62 is formed as a protrusion having a height dimension gradually increasing from the center of the outer periphery of the holding member 60 toward the end side thereof.

The holding members 60 are inserted into each of the pair of side holding member mounting recesses 55 and the bottom holding member mounting recess 57 from the outside. Then, the perimeter portion of the portion 55a of the side holding member mounting recess 55 on the main mounting plate part 42 side or the perimeter portion of the bottom securing plate part 56 is fitted into the securing groove 61 of the holding member 60. The locking protrusions 62 are locked with the both edges of the portions 55b of the side holding member mounting recess 55 on the side securing plate part 54 side or the edge on one side of the bottom securing plate part 56 from the inside. Accordingly, the holding members 60 are mounted and secured to the mounting plate 40.

In this mounting state, the inner space of the holding member 60 is located approximately at the same position as the portion 55a of the side holding member mounting recess 55 on the main mounting plate part 42 side or the bottom holding member mounting recess 57 in front view of the mounting plate 40. Accordingly, a plurality of mounting members 18 can be collectively inserted into the corresponding holding members 60.

Formed in the outer peripheral portion of each holding member 60 is a locking body holding groove 64 into which the locking body 70 can be inserted. It is preferable that the locking body holding groove 64 have approximately the same groove width as the diameter of the locking body 70 so as to hold the locking body 70 without rattling as little as possible in the orthogonal direction to the surface of the recess 46. The locking body holding groove 64 is formed at a position apart from (in this case, at a position slightly apart from) the surface of the recess 46 on the airbag 32 side in the state in which the holding member 60 is mounted to the mounting plate 40. The locking body 70 inserted into the locking body holding groove 64 is held in non-contact with the surface of the recess 46 on the airbag 32 side.

One end of the holding member 60 is disposed so as to protrude into the airbag housing space between the mounting plate 40 and the cover 36 in the state in which the holding member 60 is mounted. Then, the tip portion of the portion of the holding member 60, which is disposed so as to protrude, is formed as an inclined surface 65 to be inclined having a height dimension gradually becoming smaller toward the inside of the airbag housing space. The inclined surface 65 is a portion having the function as an interference suppressing part. The inclined surface 65 is not necessarily required to be flat but may be curved.

The auxiliary biasing members 74 are secured to the mounting plate 40 at the positions so as to come into sliding contact with the pair of inclined wire portions 70c of the locking body 70.

That is, the auxiliary biasing member securing holes 47 are formed at the positions in the mounting plate 40 that correspond to the pair of inclined wire portions 70c of the locking body 70. In this case, the auxiliary biasing member securing hole 47 is formed into a hole shape obtained by cutting a vertex of a triangle.

The auxiliary biasing member 74 is a long member formed of a resin or the like, and has a configuration in which a sliding part 75, a plate part 76, a locking part 77, and a spring securing part 78 are provided from one end to the other end thereof (see, particularly, FIG. 12).

The plate part 76 is formed into a teardrop shape in which one end thereof has a round shape and the other end thereof is pointed, and is disposed in the periphery of the auxiliary biasing member securing hole 47 on the airbag 32 side.

The sliding part 75 is formed into an arced wall shape, and is provided in a protruding manner in a circular portion on one end side of the plate part 76, with the protruding-side portion thereof being directed to the pointed portion on the other end side of the plate part 76.

The locking part 77 is formed into a plate shape (plate shape obtained by cutting a vertex of a triangle) that can be inserted into the auxiliary biasing member securing hole 47. Formed between the locking part 77 and the plate part 76 is a gap 77a into which the peripheral portion of the auxiliary biasing member securing hole 47 of the mounting plate 40 can be wedged.

The spring securing part 78 is formed into a long shape so as to extend from the locking part 77 toward the side opposite to the sliding part 75. The spring securing part 78 has a configuration obtained by splitting a tubular member in three, which is not necessarily required. In addition, a projection 78a that can be locked with a spring 79 is formed at the proximal end portion of the spring securing part 78. The spring 79 is fitted onto the spring securing part 78, so that the spring 79 is locked with and secured to the projection 78a in the state where one end of the spring 79 abuts against the locking part 77.

The auxiliary biasing member 74 is secured to the mounting plate 40 as described below. That is, the locking part 77 and the spring securing part 78 of the auxiliary biasing member 74 are inserted into the auxiliary biasing member securing hole 47 from the airbag 32 side. Then, the locking part 77 is caused to pass through the auxiliary biasing member securing hole 47, and then, the auxiliary biasing member 74 is appropriately rotated, so that the periphery of the auxiliary biasing member securing hole 47 is sandwiched between the plate part 76 and the locking part 77. On this occasion, the pointed portion on the other end side of the plate part 76 and the protruding-side portion of the sliding part 75 are directed toward the side wire portion 70b (downwardly). As a result, the pointed portion on the other end side of the plate part 76 is configured so as to be disposed between the recess 46 and the inclined wire portion 70c, and the protruding-side portion of the sliding part 75 is configured so as to slide in the outwardly facing portion of the inclined wire portion 70c.

In the above-mentioned securing state, a raised potion formed on the inner-surface-side of the plate part 76 is fitted into the recess of the mounting plate 40, which is formed in the peripheral portion of the auxiliary biasing member securing hole 47. This enables the positioning when the auxiliary biasing member 74 is installed and prevents the auxiliary biasing member 74 from rotating after being installed.

The auxiliary biasing member 74 is secured to the mounting plate 40 in this manner, and then, the spring 79 is mounted and secured to the spring securing part 78. In this case, the auxiliary biasing member 74 is mounted also to the lower portion of the mounting plate 40. The auxiliary biasing member 74 provided at this position mainly serves to support the spring 79 at this position.

The locking body 70 is held on the mounting plate 40 by the holding members 60 as described below. The locking body 70 is disposed in the recess 46 of the mounting plate 40. In this state, the holding members 60 are mounted to the mounting plate 40 while inserting the locking body 70 into the locking body holding grooves 64 of the holding members 60. Accordingly, the locking body 70 is held on the mounting plate 40 on the airbag 32 side in the state in which the intermediate wire portion 70a is inserted to and held by the locking body holding groove 64 of the holding member 60 in the lower portion of the mounting plate 40 and the pair of side wire portions 70b are inserted into and held by the locking body holding grooves 64 of the holding members 60 on the both sides of the mounting plate 40.

Needless to say, the locking body 70 may be held on the mounting plate 40 after mounting the holding member 60 to the mounting plate 40. In this case, in the state in which the pair of side wire portions 70b are pushed to be closer to each other, the intermediate wire portion 70a of the locking body 70 is inserted into the locking body holding groove 64 of the holding member 60 mounted to the lower portion of the mounting plate 40, and the pair of side wire portions 70b thereof are inserted into the locking body holding grooves 64 of the holding members 60 mounted to the both sides of the mounting plate 40. Then, it suffices that the force for pushing the pair of side wire portions 70b to be closer to each other is released.

In the above-mentioned state, the pair of side wire portions 70b are biased in the direction in which they become apart from each other by the elastic force of the locking body 70 itself. This biasing force acts as the force for pushing the pair of side wire portions 70b outwardly so as to be locked with the mounting members 18 corresponding thereto.

Figure 13:
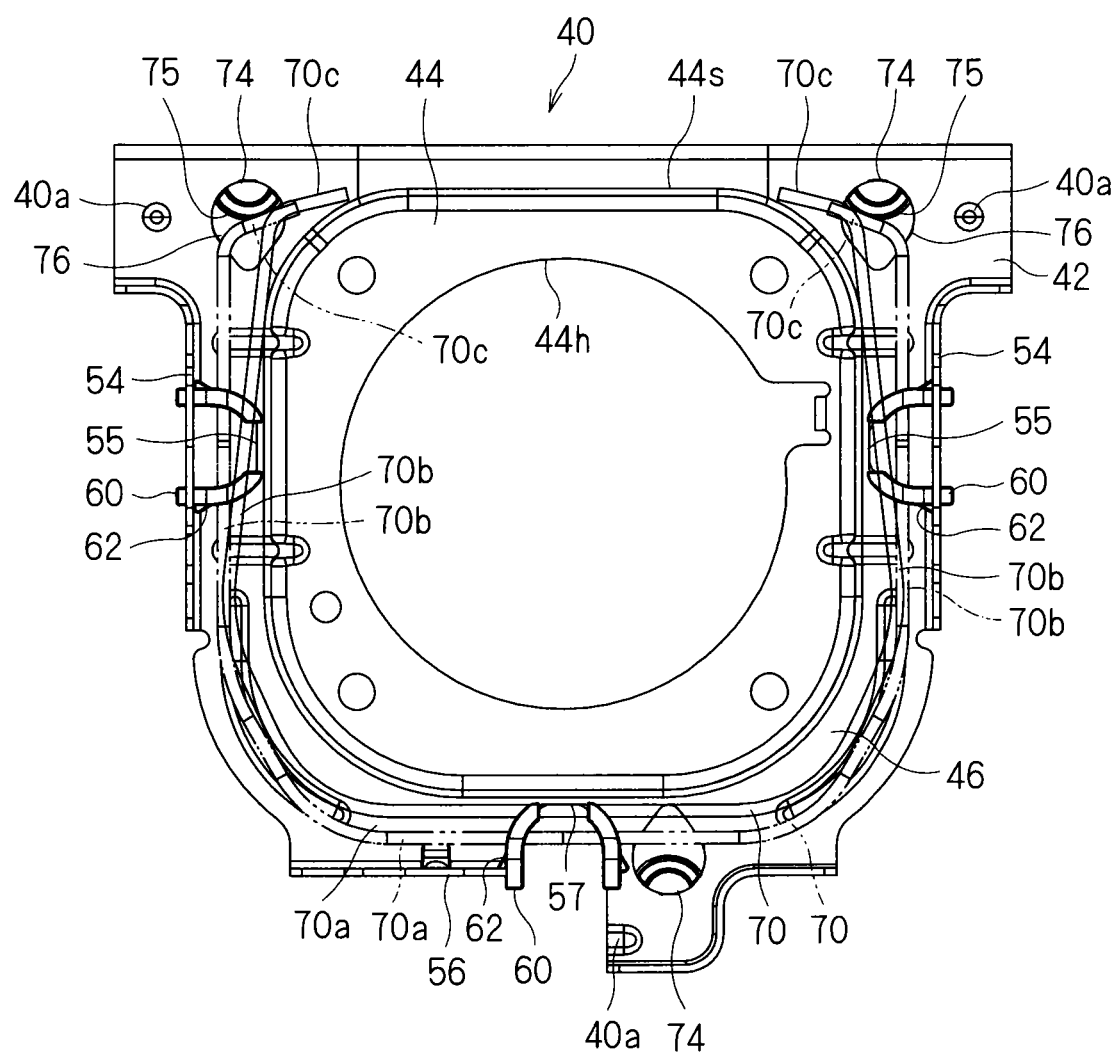
FIG. 13 is an explanatory view showing the operation of the locking body.

FIG. 13 is an explanatory view showing the operation of the locking body 70. FIG. 13 shows the locking body 70 in a normal state by a chain double-dashed line and the locking body 70 moved upwardly by a solid line.

First, in the normal mounting state of the locking body 70, the inclined wire portions 70c are in contact with the protruding-side portions of the sliding parts 75. The locking body 70 is moved upwardly in this state, whereby the inclined wire portions 70c are pulled inwardly while being in sliding contact with the protruding-side portions of the sliding parts 75. As a result, the pair of side wire portions 70b are pushed to become narrow against the elastic force of the locking body 70 itself. Then, the force for upwardly moving the locking body 70 is released, whereby the pair of side wire portions 70b are caused to be apart from each other by the elastic force of the locking body 70 itself. This causes the inclined wire portions 70c to come into sliding contact with the protruding-side portions of the sliding parts 75 while moving outwardly. Then, the locking body 70 is biased toward the locking body holding groove 64 of the holding member 60 in the lower portion. This biasing force acts the force for pushing the intermediate wire portion 70a outwardly so as to be locked with the corresponding mounting member 18.

As described above, the locking body 70 is held on the mounting plate 40 in such a manner that the biasing force acts in the direction in which the locking body 70 is locked with each of the mounting members 18.

In the state in which the locking body 70 is moved upwardly to abut against the step 44s, the position of the locking body holding groove 64 of the holding member 60 and the position of the step 44s are set such that the pair of side wire portions 70b do not become detached from the locking body holding grooves 64 of the corresponding holding members 60. This prevents the locking body 70 from becoming detached inadvertently.

It is preferable that in the state in which the locking body 70 is mounted, more than a half of the cross section of the locking body 70 should not protrude from the surface of the inflator mounting plate part 44 on the airbag 32 side. In other words, it is preferable that more than a half of the cross section of the locking body 70 be located on the airbag 32 side with respect to the surface of the inflator mounting plate part 44 on the airbag 32 side.

Figure 14:
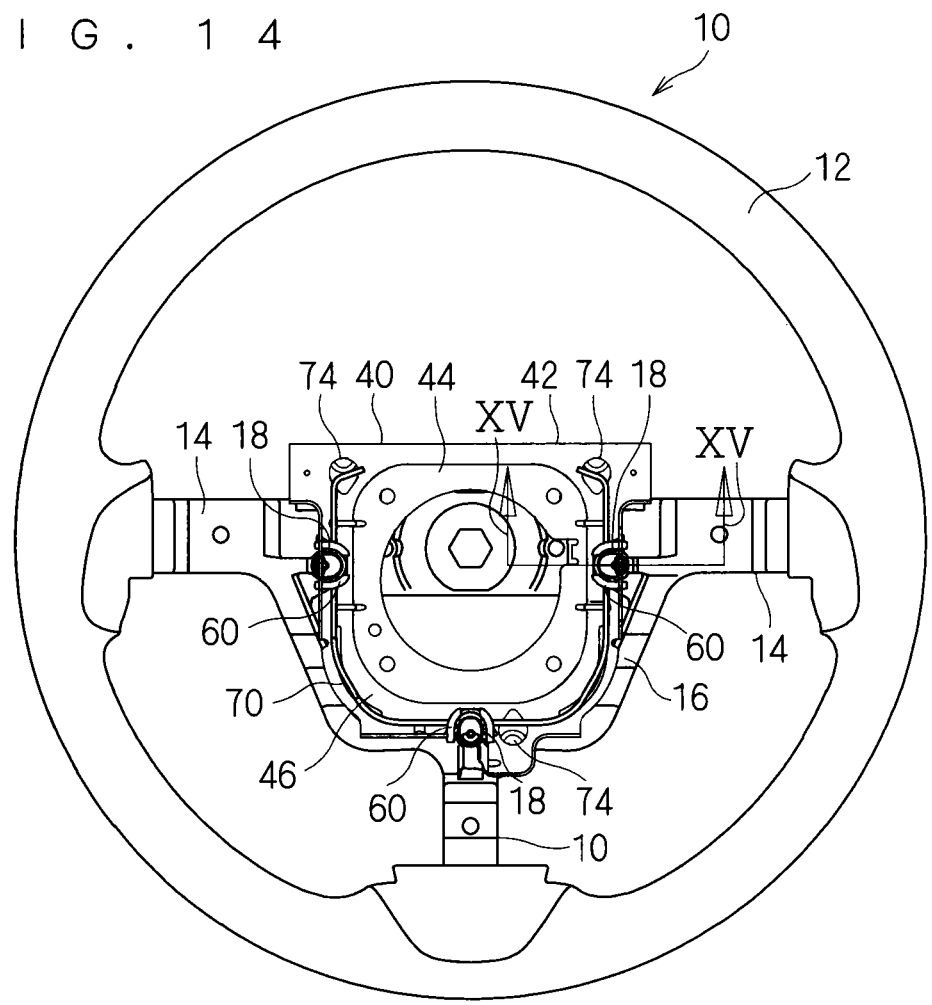
FIG. 14 is a front view showing a state in which the mounting plate is mounted to the steering wheel.
Figure 15:
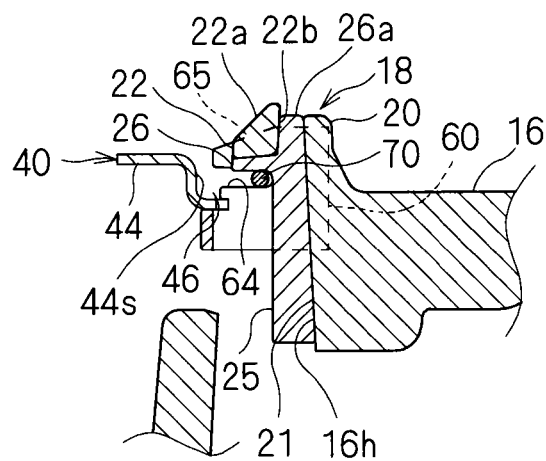
FIG. 15 is a cross-sectional view taken along a line XV-XV of FIG. 14.
Figure 16:
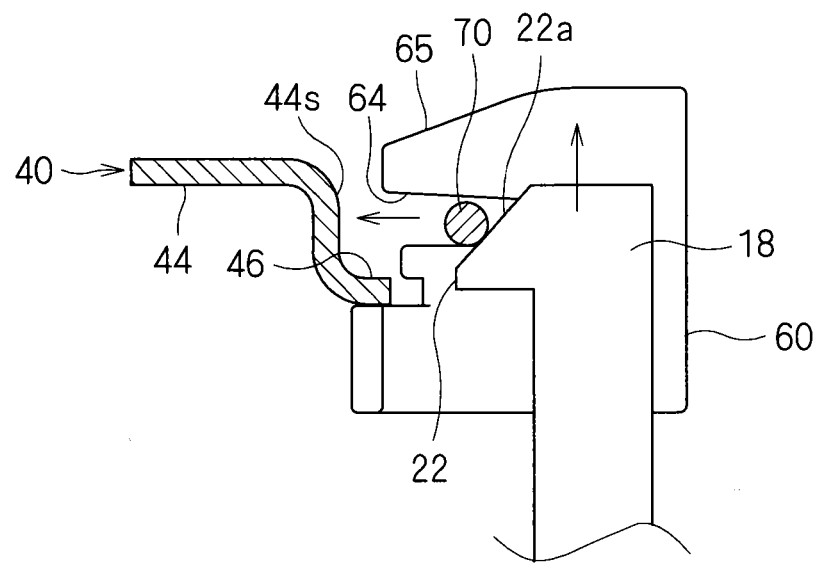
FIG. 16 is an explanatory view showing an operation in which the mounting member is locked with the locking body.
Figure 17:
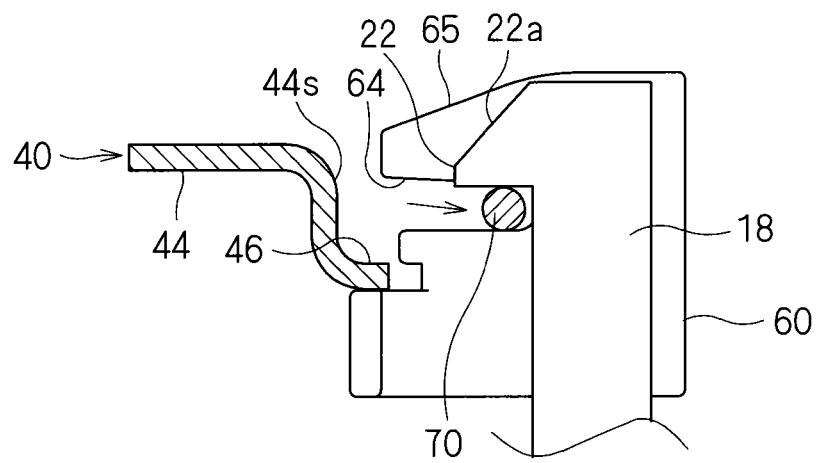
FIG. 17 is another explanatory view showing the operation in which the mounting member is locked with the locking body.

FIG. 14 is a front view showing a state in which the mounting plate 40 is mounted to the steering wheel 10, FIG. 15 is a cross-sectional view taken along a line XV-XV of FIG. 14, and FIGS. 16 and 17 are explanatory views showing the operation in which the mounting member 18 is locked with the locking body 70. For the sake of description, FIGS. 16 and 17 show the mounting body member 20 and the cap member 24 integrated with each other.

As shown in these figures, each mounting member 18 is inserted into the holding member 60 secured to the mounting plate 40 from the steering wheel 10 side, to thereby being locked with the locking body 70 in the holding member 60.

That is, the airbag device 30 is pushed toward the steering wheel 10 such that each mounting member 18 is inserted into the holding member 60 corresponding thereto. Then, the inclined surface 22a at the tip portion of the mounting member 18 comes into contact with the locking body 70 (see FIG. 16). Accordingly, the locking body 70 is elastically deformed so as to be pushed toward the inside thereof by the inclined surface 22a. Then, the locking protrusion 22 of the mounting member 18 goes beyond the locking body 70, whereby the locking body 70 returns elastically and then abuts against the proximal end of the locking protrusion 22. This results in that the mounting member 18 is locked with the locking body 70 so as not to slip off. The above is performed collectively or sequentially between the plurality of mounting members 18 and the portions of the locking body 70 in the corresponding holding members 60. Accordingly, the locking body 70 is locked so as not to slip off in the holding members 60 corresponding to the plurality of mounting members 18, resulting in that the airbag device 30 is mounted and secured to the steering wheel 10.

In this state, the springs 79 are arranged between the core member 16 of the steering wheel 10 and the mounting plate 40 in a compressed state. The springs 79 serve to bias the mounting plate 40 in a direction in which the mounting plate 40 becomes apart from the core member 16 of the steering wheel 10. The biasing force prevents rattling between the core member 16 of the steering wheel 10 and the mounting plate 40.

Meanwhile, when the locking body 70 is pressed inwardly by each of the holding members 60 in a successive manner, the locking between the mounting members 18 and the locking body 70 is released. Accordingly, the airbag device 30 can be demounted from the steering wheel 10.

Further, in the normal state, the biasing force keeps the core member 16 of the steering wheel 10 and the mounting plate 40 in a non-contact state. In the present embodiment, with the use of the above, a horn switch structure is incorporated in the core member 16 of the steering wheel 10 and the mounting plate 40.

That is, at least one securing-side contact part 16a is provided in the core member 16 so as to be exposed to the mounting plate 40 side. The present embodiment assumes the case in which three securing-side contact parts 16a are provided, though FIG. 1 shows only one of them. In addition, moving-side contact parts 40a are provided at the positions opposed to the securing-side contact parts 16a in the mounting plate 40 (see FIGS. 1, 8, and 9). There is incorporated a horn blow circuit that is turned on/off by the securing-side contact parts 16a and the moving-side contact parts 40a. In the state in which the airbag device 30 is mounted to the steering wheel 10, the securing-side contact part 16a and the moving-side contact part 40a are not in contact with each other by the biasing force of the spring 79, which are in a non-conductive state. When a driver pushes the cover 36 in this state, the mounting plate 40 is pushed toward the core member 16 side of the steering wheel 10 against the biasing force of the spring 79. As a result, the moving-side contact part 40a comes into contact with the corresponding securing-side contact part 16a, and they enter a conductive state. This makes a horn blow.

Needless to say, the horn switch structure is not required to be incorporated in this portion, but a horn switch may be incorporated in the surface portion of the cover 36.

According to the airbag device 30 configured as described above, the mounting plate 40 includes the recess 46 that is recessed from the inflator mounting plate part 44 being the portion for mounting the inflator 34, and the locking body 70 is provided in the recess 46. Accordingly, it is possible to prevent the locking body 70 from protruding from the mounting plate 40 as much as possible. This prevents a hand or the like of an operator from inadvertently coming into contact with the locking body 70 during an operation of mounting the airbag 32, the inflator 34, the cover 36, and the like to the mounting plate 40.

Moreover, more than a half of the cross section of the locking body 70 does not protrude from the surface of the inflator mounting plate part 44 on the airbag 32 side, which prevents a hand or the like of an operator from coming into contact with the locking body 70 more reliably.

Accordingly, it is possible to prevent the locking body 70 from, for example, becoming detached during an assembly operation, which allows smooth execution of the assembly operation.

It is normally assumed that the locking body 70 is merely pushed into the recess 46 even if a hand or the like of an operator comes into contact with the locking body 70. Also in this respect, it could be said that the locking body 70 is prevented from, for example, becoming detached during an assembly operation.

The locking body 70 is provided on the airbag 32 side with respect to the mounting plate 40, and accordingly, the external force by a hand or the like of an operator is unlikely to be exerted on the locking body 70 after the airbag 32, the inflator 34, the cover 36, and the like are mounted to the mounting plate 40 and the airbag device 30 is installed. As a result, the locking body 70 is unlikely to become detached. In addition, the locking body 70 is provided in the recess 46 of the mounting plate 40, which is recessed toward the steering wheel 10 side from the surface of the inflator mounting plate part 44. This makes it easy to sufficiently secure the space for housing the airbag 32 between the mounting plate 40 and the cover 36. Moreover, the airbag 32 is unlikely to interfere with the locking body 70 disposed in the recess 46 when being inflated and deployed, and accordingly, the airbag 32 is inflated and deployed stably.

The locking body 70 interferes with the folded airbag if the locking body is provided on the airbag side, and thus, a fear arises that the space for enabling elastic deformation of a locking body that is required for mounting/demounting a locking body to/from the mounting member cannot be secured. That is, there arises a fear that a locking body and a folded airbag may interfere with each other and the locking body may not be deformed, which prohibits smooth mounting/demounting of the locking body to/from a mounting member. In the present embodiment, meanwhile, the locking body 70 is provided in the recess 46, and thus, is unlikely to interfere with the folded airbag 32. This allows smooth deformation of the locking body 70. Therefore, the mounting member 18 and the locking body 70 can be mounted/demounted easily.

The locking body 70 is formed of a metal wire that can be elastically deformed, which enables to generate the biasing force on the mounting member 18 by the elastic force of the elastic body 70 itself. In addition, the biasing force increases the force for keeping the locking between the mounting member 18 and the locking body 70, so that the state in which the airbag device 30 is installed can be kept more reliably.

The inclined surface 22a is formed in the portion of the mounting member 18, which protrudes toward the airbag housing space side, and the inclined surface 65 is formed in the portion of the holding member 60, which protrudes toward the airbag housing space side. For this reason, the airbag 32 is guided toward the cover 36 side by the inclined surfaces 22a and the inclined surfaces 65 if the airbag 32 that is inflated and deployed in the airbag housing space comes into contact with the mounting members 18 and the holding members 60. This prevents the interference between the airbag 32, and the mounting members 18 and the holding members 60. This stabilizes the operation of deploying the airbag 32.

The recess 46 is provided so as to surround the inflator disposing hole 44h. This enables to dispose the locking body 70 so as to surround the inflator 34 and lock the mounting members 18 with the locking body at a plurality of positions (in this case, three positions). This further stabilizes the state in which the airbag device 30 is mounted.

In the present embodiment, the horn switch structure is installed in the core member 16 of the steering wheel 10 and the mounting plate 40. This requires that the core member 16 and the mounting plate 40 be not in electrical contact with each other in the normal state. Therefore, the holding members 60 made of resin hold the locking body 70 in the present embodiment. This results in that the holding members 60 are arranged between the mounting plate 40 and the locking body 70, so that the non-conductive state also between the mounting plate 40 and the locking body 70 is kept. Further, the mounting member 18 is configured such that the cap member 24 made of resin is mounted to the mounting body member 20 integrally formed with the core member 16. Accordingly, the cap member 24 is arranged between the core member 16 and the locking body, which keeps the non-conductive state between the core member 16 and the locking body 70. That is, a physical contact between some members is unavoidable in the securing structure of the steering wheel 10 and the mounting member 18, and thus, the present embodiment achieves a double insulation structure with the holding members 60 and the cap members 24. This secures more reliable insulating properties between the core member 16 of the steering wheel 10 and the mounting plate 40.

The holding member 60 and the cap member 24 have the function of preventing rattling between the respective members irrespective of whether or not the horn switch structure is incorporated.

<Modifications>

The present embodiment has described the example in which the locking body 70 is located on the steering wheel 10 side with respect to the mounting plate 40, which is not necessarily required. Alternatively, a locking body may be provided on the steering wheel side with respect to a mounting plate. In this case, a recess may be made so as to be recessed toward an airbag side from a steering wheel.

The recess is not necessarily required to be recessed via a step but may be recessed via a certain inclined surface. However, the configuration in which the recess 46 is recessed via the step 44s as in the present embodiment prevents a human hand or the like from coming into contact with the locking body 70 within the recess 46 more reliably.

A part of the locking body 70 may protrude beyond the surface of the inflator mounting plate part 44 on the airbag 32 side.

The spring 79 is not necessarily required. For example, the spring 79 itself may not be provided in a case where the switch structure is not incorporated. Alternatively, a spring may be replaced with another elastic member such as rubber.

The position or the like of the recess 46 is not limited to the above-mentioned example. For example, a pair of recesses may be formed at both side portions of an inflator disposing hole. In this case, a common or separate lock bodies may be provided in the pair of recesses.

The position of the locking body 70 is not also limited to the above-mentioned example. It suffices that a locking body is provided in at least one of the recesses.

The configuration of a locking body is not limited to the above-mentioned example as well. For example, a locking body may be configured such that the mounting member 18 is locked with a torsion-coil-spring-like or plate-spring-like locking body.

That is, it suffices that a recess is formed in the mounting plate 40 and any locking body that can be locked with a mounting member is provided in the recess. Needless to say, it is preferable that a recess be provided so as to surround the inflator disposing hole 44h from at least two directions and that the locking body 70 be also provided so as to surround the inflator disposing hole 44h from at least two directions.

It is not necessarily required to form the end portions of the mounting member 18 and the holding member 60 as the inclined surface 22a and the inclined surface 65, respectively. Alternatively, only any one of them may be formed as an inclined surface.

The locking configuration of the mounting member 18 and the locking body 70 is not limited to the above-mentioned example. For example, a locking body may be configured to be locked with a mounting member from the outer peripheral side.

While the present invention has been described in detail, the foregoing description is in all aspects illustrative, and the present invention is not limited thereto. That is, numerous modifications and variations can be devised in the described aspects without departing from the scope of the invention.

Description of Reference Symbols 10 steering wheel
18 mounting member
30 airbag device
32 airbag
34 inflator
36 cover
40 mounting plate
44 inflator mounting plate part
44h inflator disposing hole
46 recess
55 side holding member mounting recess
57 bottom holding member mounting recess
60 holding member
64 locking body holding groove
65 inclined surface
70 locking body

The invention claimed is:

1. An airbag device that is mounted to a steering wheel in which a mounting member is provided in a protruding manner, comprising:
an airbag;
an inflator configured to inflate and deploy said airbag;
a cover covering said airbag folded;
a mounting plate to which said airbag, said inflator, and said cover are secured;
a locking body configured to be locked with said mounting member; and
a holding member holding said locking body on said mounting plate,
wherein said mounting plate includes a recess recessed from a portion for mounting said inflator, and said locking body is provided in said recess.

2. The airbag device according to claim 1, wherein said locking body is provided such that more than a half of a cross section thereof does not protrude from a surface of the portion for mounting said inflator.

3. The airbag device according to claim 1, wherein:
said recess is formed to be recessed from the surface of the portion for mounting said inflator in said mounting plate toward said steering wheel side; and
said locking body is provided on said airbag side with respect to said mounting plate.

4. The airbag device according to claim 1, wherein said locking body includes a metal wire configured to be elastically deformed and is held on said mounting plate so as to exert a biasing force in a direction to be locked with said mounting member.

5. The airbag device according to claim 1, wherein at least one of said mounting member and said holding member protrudes into an airbag housing space between said mounting plate and said cover, and a tip portion of the protruding portion includes an interference suppressing part having a height dimension that gradually becomes smaller toward an inside of said airbag housing space.

6. The airbag device according to claim 1, wherein:
   an inflator disposing hole for disposing said inflator is formed in said mounting plate; and
   said recess is provided so as to surround said inflator disposing hole from at least two directions.

* * * * *